(12) United States Patent
Bryant et al.

(10) Patent No.: US 10,952,378 B2
(45) Date of Patent: Mar. 23, 2021

(54) GROUNDS MAINTENANCE VEHICLE WITH REMOVABLE CONTROL TOWER SKIN

(71) Applicant: EXMARK MANUFACTURING COMPANY, INCORPORATED, Beatrice, NE (US)

(72) Inventors: Christian S. C. Bryant, Lincoln, NE (US); Nickolas T. Moore, Beatrice, NE (US); Patrick D. Sands, Firth, NE (US)

(73) Assignee: EXMARK MANUFACTURING COMPANY, INCORPORATED, Beatrice, NE (US)

( * ) Notice: Subject to any disclaimer, the term of this patent is extended or adjusted under 35 U.S.C. 154(b) by 37 days.

(21) Appl. No.: 16/403,434

(22) Filed: May 3, 2019

(65) Prior Publication Data

US 2020/0344953 A1    Nov. 5, 2020

(51) Int. Cl.
| | |
|---|---|
| *A01D 67/00* | (2006.01) |
| *A01D 34/90* | (2006.01) |
| *A01D 34/86* | (2006.01) |
| *A01D 34/76* | (2006.01) |
| *A01D 69/00* | (2006.01) |
| *A01D 34/00* | (2006.01) |
| A01D 34/68 | (2006.01) |

(52) U.S. Cl.
CPC ......... *A01D 67/005* (2013.01); *A01D 34/001* (2013.01); *A01D 34/76* (2013.01); *A01D 34/866* (2013.01); *A01D 34/90* (2013.01); *A01D 69/00* (2013.01); *A01D 2034/6837* (2013.01)

(58) Field of Classification Search
None
See application file for complete search history.

(56) References Cited

U.S. PATENT DOCUMENTS

| | | |
|---|---|---|
| 2,833,364 A | 5/1958 | Lee |
| 8,047,310 B2 | 11/2011 | Kallevig |
| 8,262,104 B2 | 9/2012 | Kallevig et al. |
| 10,729,073 B2 | 8/2020 | Bryant et al. |

(Continued)

FOREIGN PATENT DOCUMENTS

WO    WO 2017214467 A1    12/2017

OTHER PUBLICATIONS

U.S. Appl. No. 16/403,436, filed May 3, 2019, Moore.

(Continued)

*Primary Examiner* — Lori L Lyjak
(74) *Attorney, Agent, or Firm* — Mueting Raasch Group

(57) ABSTRACT

Various embodiments of a grounds maintenance vehicle are disclosed. The vehicle includes a frame and a control tower disposed at or near a rear end of the frame. The control tower includes a support structure that defines an interior space of the control tower and a nonplanar removable skin connected to the support structure. The removable skin includes a front side disposed over a front side of the support structure and a lateral side disposed over at least one of a left side or a right side of the support structure. A portion of at least one of the front side or lateral side of the removable skin is disposed above an uppermost surface of the prime mover. Further, the removable skin is adapted to be at least partially removed from the support structure to facilitate additional access to the interior space of the control tower.

20 Claims, 6 Drawing Sheets

(56) References Cited

U.S. PATENT DOCUMENTS

| | | | |
|---|---|---|---|
| 2019/0133039 A1* | 5/2019 | Bryant | A01D 69/03 |
| 2019/0254228 A1* | 8/2019 | Tate | A01D 34/82 |
| 2019/0357429 A1 | 11/2019 | Andre et al. | |
| 2020/0080501 A1* | 3/2020 | Andre | F02D 41/042 |
| 2020/0282826 A1* | 9/2020 | Moore | B60K 15/073 |

OTHER PUBLICATIONS

U.S. Appl. No. 16/402,938, filed May 3, 2019, Bryant et al.

U.S. Appl. No. 16/402,963, filed May 3, 2019, Bryant et al.

IDS NPL Document 1, Wright Stander 1, Product No. X 48 FX730E; Wright Manufacturing, Inc. Frederick, MD; Product believed available at least as early as Mar. 19, 2019; 1 page.

IDS NPL Document 2, Wright Stander X, Product No. 36 FX600E; Wright Manufacturing, Inc. Frederick, MD; Product believed available at least as early as Mar. 19, 2019; 1 page.

IDS NPL Document 3, Wright Stander ZK, Product No. 5261E8E; Wright Manufacturing, Inc. Frederick, MD; Product believed available at least as early as Mar. 19, 2019; 1 page.

IDS NPL Document 4, Wright Stander SM, Product No. 32 FS541R; Wright Manufacturing, Inc. Frederick, MD; Product believed available at least as early as Mar. 19, 2019; 1 page.

IDS NPL Document 5, Wright Stander LG, Product No. FX730E; Wright Manufacturing, Inc. Frederick, MD; Product believed available at least as early as Mar. 19, 2019; 1 page.

IDS NPL Document 6, Wright Stander B, Product No. 32 FS600E; Wright Manufacturing, Inc. Frederick, MD; Product believed available at least as early as Mar. 19, 2019; 1 page.

IDS NPL Document 7, Husqvarna V548, Product No. 967 67 25-01, Husqvarna AB, Charlotte, NC (US Headquarters); Product believed available at least as early as Mar. 19, 2019; 1 page.

IDS NPL Document 7, Husqvarna V554, Product No. 067 67 26-01, Husqvarna AB, Charlotte, NC (US Headquarters); Product believed available at least as early as Mar. 19, 2019; 1 page.

IDS NPL Document 8, Scag V-Ride II, Scag Power Equipment, Mayville, WI; Product believed available at least as early as Mar. 19, 2019; 2 pages.

IDS NPL Document 9, Exmark Stand-On Spreader Sprayer, Model No. SSS395CKC00000, Exmark Manufacturing Company Incorporated, Beatrice, NE, Product believed available at least as early as Mar. 19, 2019; 2 pages.

IDS NPL Document 10, Vermeer FTX25 Trencher, Vermeer Corporation, Pella, IA; Product believed available at least as early as Mar. 19, 2019; 2 pages.

* cited by examiner

GROUNDS MAINTENANCE VEHICLE WITH REMOVABLE CONTROL TOWER SKIN

Embodiments of the present disclosure are directed to grounds maintenance vehicles such as stand-on lawn mowers and, more particularly, to such vehicles having a control tower with a removable skin.

BACKGROUND

Riding grounds maintenance vehicles such as lawn mowers and the like are used by homeowners and professionals to care for lawns and other surfaces. These vehicles include a prime mover, e.g., internal combustion engine or electric motor, to power not only an implement (e.g., cutting deck) attached to the vehicle but also a traction drive system, the latter adapted to propel the vehicle over a ground surface.

Landscape contractors sometimes prefer stand-on mowers. Such mowers typically include a standing platform located behind the mower's rear wheels and a tower forward of the platform to support various hand controls.

One benefit of stand-on mowers is that they are often shorter than conventional riding mowers and, consequently, may be more maneuverable under certain mowing conditions. Typically, stand-on mowers utilize an engine having a horizontally- or vertically-oriented drive shaft to provide power, e.g., via endless belts, to both the cutting deck and to the traction drive system. Each drive wheel may utilize its own hydrostatic pump, and each pump may be independently controlled to provide the mower with a very small turning radius and, in some instances, a zero-turning-radius (ZTR) where the mower can spin about a midpoint between the two drive wheels. Some components of the mower may be located within or proximate the tower.

SUMMARY

In general, the present disclosure describes various embodiments of a grounds maintenance vehicle that includes a frame having a control tower. The control tower includes a support structure and a removable skin connected to the support structure. The skin is adapted to be at least partially removed from the support structure to facilitate additional access to an interior space of the control tower that is defined by the support structure.

In one aspect, the present disclosure provides a grounds maintenance vehicle that includes a frame having a front end, a rear end, and a control tower disposed at or near the rear end of the frame. The control tower includes a support structure that defines an interior space of the control tower. The control tower also includes a nonplanar removable skin connected to the support structure. The removable skin includes a front side disposed over a front side of the support structure and a lateral side disposed over at least one of a left side or a right side of the support structure. A portion of at least one of the front side or lateral side of the removable skin is disposed above an uppermost surface of a prime mover that is connected to the frame. Further, the removable skin is adapted to be at least partially removed from the support structure to facilitate additional access to the interior space of the control tower.

In another aspect, the present disclosure provides a stand-on riding grounds maintenance vehicle that includes a frame having a front end, a rear end, and a control tower disposed at or near the rear end of the frame. The control tower includes a platform attached to the frame at or near the rear end, where the platform is adapted to support a standing operator; a support structure that defines an interior space of the control tower; and a prime mover connected to the frame at or near the control tower. The control tower also includes a nonplanar removable skin connected to the support structure. The removable skin includes a front side disposed over a front side of the support structure and a lateral side disposed over at least one of a left side or a right side of the support structure. A portion of at least one of the front side or lateral side of the removable skin is disposed above an uppermost surface of the prime mover. Further, the removable skin is adapted to be at least partially removed from the support structure to facilitate additional access to the interior space of the control tower.

In another aspect, the present disclosure provides a stand-on riding grounds maintenance vehicle that includes a frame having a front end, a rear end, and a control tower disposed at or near the rear end of the frame. The control tower includes a platform attached to the frame at or near the rear end, where the platform is adapted to support a standing operator; a support structure that defines an interior space of the control tower; and a prime mover connected to the frame at or near the control tower. The control tower also includes a nonplanar unitary removable skin connected to the support structure. The removable skin includes a front side that is disposed over and removably connected to a front side of the support structure, a lateral side that is disposed over and removably connected to a left side of the support structure, and a second lateral side that is disposed over and removably connected to a right side of the support structure. A portion of at least one of the front side, lateral side, or second lateral side of the support structure is disposed above an uppermost surface of the prime mover. Further, the removable skin is adapted to be removed from the support structure to facilitate additional access to at least one of the prime mover, a traction drive system, or an actuation mechanism. The control tower also includes a pad disposed over and connected to a rear side of the support structure.

The above summary is not intended to describe each embodiment or every implementation. Rather, a more complete understanding of illustrative embodiments will become apparent and appreciated by reference to the following Detailed Description of Exemplary Embodiments and claims in view of the accompanying figures of the drawing.

BRIEF DESCRIPTION OF THE VIEWS OF THE DRAWING

Exemplary embodiments will be further described with reference to the figures of the drawing, wherein.

Figure 1:
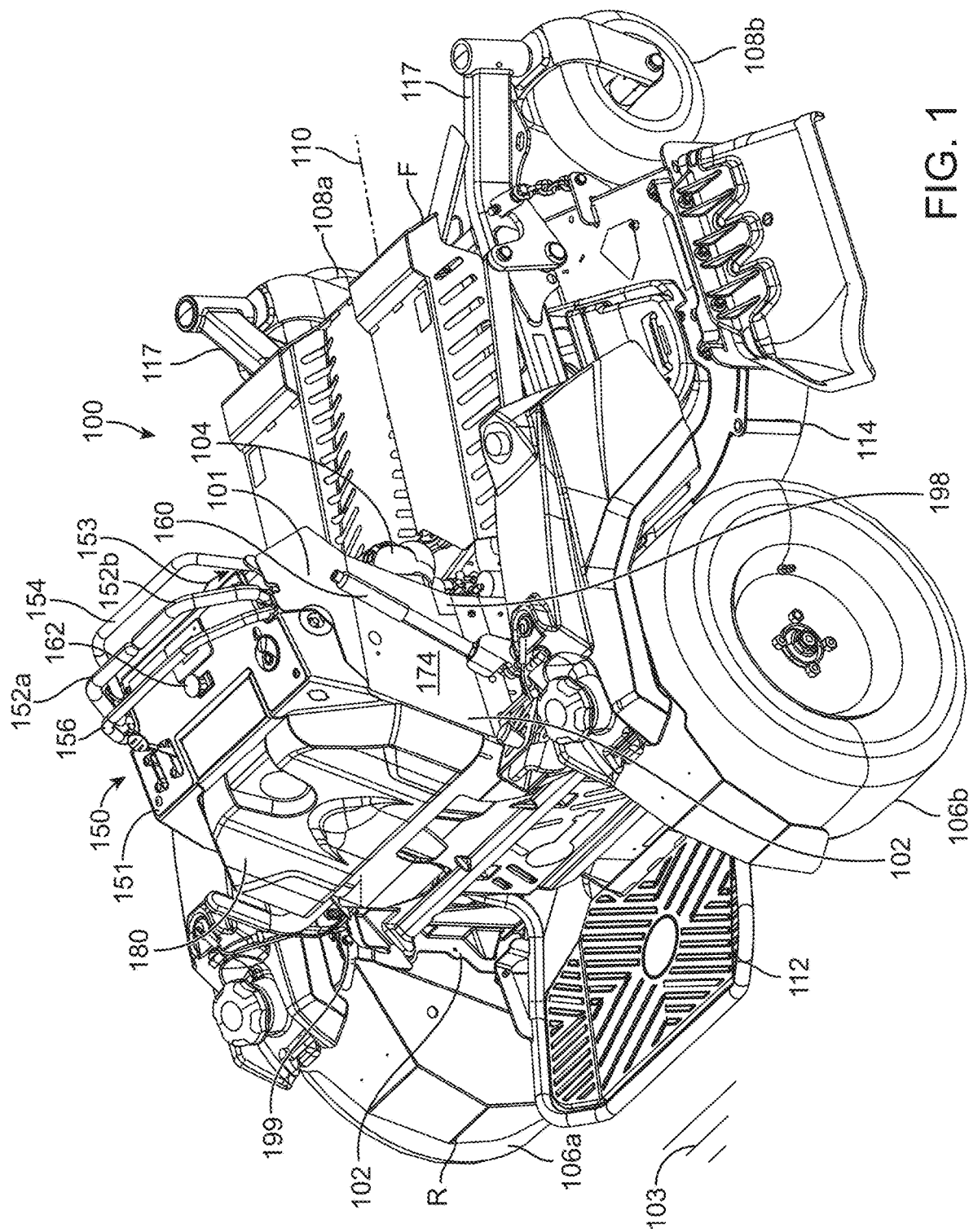
FIG. 1 is a right rear perspective view of one embodiment of a self-propelled grounds maintenance vehicle, e.g., stand-on riding grounds maintenance vehicle.

The figures are rendered primarily for clarity and, as a result, are not necessarily drawn to scale. Moreover, various structure/components, including but not limited to fasteners, electrical components (wiring, cables, etc.), and the like, may be shown diagrammatically or removed from some or all of the views to better illustrate aspects of the depicted embodiments, or where inclusion of such structure/components is not necessary to an understanding of the various exemplary embodiments described herein. The lack of illustration/description of such structure/components in a particular figure is, however, not to be interpreted as limiting the scope of the various embodiments in any way.

DETAILED DESCRIPTION OF EXEMPLARY EMBODIMENTS

In the following detailed description of exemplary embodiments, reference is made to the accompanying figures of the drawing that form a part hereof. It is to be understood that other embodiments, which may not be described and/or illustrated herein, are certainly contemplated.

All headings provided herein are for the convenience of the reader and should not be used to limit the meaning of any text that follows the heading, unless so specified. Moreover, unless otherwise indicated, all numbers expressing quantities, and all terms expressing direction/orientation (e.g., vertical, horizontal, parallel, perpendicular, etc.) in the specification and claims are to be understood as being modified by the term "about."

In general, the present disclosure describes various embodiments of a grounds maintenance vehicle that includes a frame having a control tower. The control tower includes both a support structure and a removable skin connected to the support structure. The skin is adapted to be at least partially removed from the support structure to facilitate additional access to an interior space of the control tower that is defined by the support structure.

Currently-available stand-on mowers typically include a frame that has a control tower connected to the frame. The tower provides a control area that positions mower controls within comfortable reach of an operator who may be standing either behind the mower or upon a platform connected to the mower. The control tower can also include one or more pads disposed on a rear side of the control tower that provide support (e.g., thigh support) for the operator such that the operator can lean against the control tower during operation. Further, various components of control systems and power systems may be disposed within an interior space of the control tower that is defined by a support structure of the tower. Specifically, the term "interior space" as used herein means space contained within the support structure of the tower. Oftentimes, the support structure may be formed by slab skins, or the tower may include skins that are permanently attached to this support structure. These skins cover some or all of the components disposed within the interior space of the control tower. As a result, the skins may limit access to the components disposed within the interior space of the control tower, potentially complicating various maintenance tasks.

One or more embodiments of stand-on riding grounds maintenance vehicles described herein can include a tower at least partially formed by a removable skin connected to a support structure. The skin can be at least partially removable from the support structure to facilitate additional access to the interior space of the control tower of the vehicle. This additional access can ease maintenance or removal of one or more components of the vehicle that are disposed at least partially within the control tower. Following maintenance or replacement of one or more of the components, the removable skin can be reconnected to the support structure of the control tower. Such skin can provide protection to one or more of these components from debris, as well as provide a more aesthetically pleasing appearance.

With reference to the figures of the drawing, wherein like reference numerals designate like parts and assemblies throughout the several views, FIGS. 1-6 are various views of one embodiment of a stand-on riding grounds maintenance vehicle 100 and elements of such vehicle. While, for the sake of brevity, embodiments of the disclosure are herein described with reference to a stand-on riding grounds maintenance vehicle (hereinafter generically referred to simply as a "vehicle"), those of skill in the art will realize that the concepts described herein are equally applicable to other types of walk-behind and ride-behind vehicles (e.g., such as those utilizing sulkies), as well as to almost any other walk-behind, ride-behind, or ride-on self-propelled, grounds maintenance vehicle. Such vehicles may include, for example, skid-steer loaders, aerators, material spreaders and sprayers, snow throwers, tillers, debris management machines, etc.

It is noted that the term "comprises" and variations thereof do not have a limiting meaning where these terms appear in the accompanying description and claims. Further, "a," "an," "the," "at least one," and "one or more" are used interchangeably herein. Moreover, relative terms such as "left," "right," "front," "fore," "forward," "rear," "aft," "rearward," "top," "bottom," "side," "upper," "lower," "above," "below," "horizontal," "vertical," and the like may be used herein and, if so, are from the perspective of one operating the vehicle 100 while the vehicle is in an operating configuration, e.g., while the vehicle 100 is positioned such that ground engaging members (e.g., wheels 106 and 108) rest upon a generally horizontal ground surface 103 as shown in FIG. 1. These terms are used only to simplify the description, however, and not to limit the interpretation of any embodiment described.

Still further, the suffixes "a" and "b" may be used throughout this description to denote various left- and right-side parts/features, respectively. However, in most pertinent respects, the parts/features denoted with "a" and "b" suffixes are substantially identical to, or mirror images of, one another. It is understood that, unless otherwise noted, the description of an individual part/feature (e.g., part/feature identified with an "a" suffix) also applies to the opposing part/feature (e.g., part/feature identified with a "b" suffix). Similarly, the description of a part/feature identified with no suffix may apply, unless noted otherwise, to both the corresponding left and right part/feature.

While not necessarily central to an understanding of exemplary embodiments of the present disclosure (e.g., other vehicle configurations are certainly contemplated), the general construction of the exemplary vehicle 100 is briefly described below. FIGS. 1-3 and 6 illustrate the vehicle 100 having a chassis or frame 102 that includes a front end F, a rear end R, and a longitudinal axis 110 extending between the front and rear ends. The frame 102 also includes a control tower 101 disposed at or near (e.g., slightly forward of) the rear end R of the frame. The control tower 101 includes a left side 196 (FIG. 2), a right side 198 (FIG. 1), a front side 197, and a rear side 199.

Figure 3:
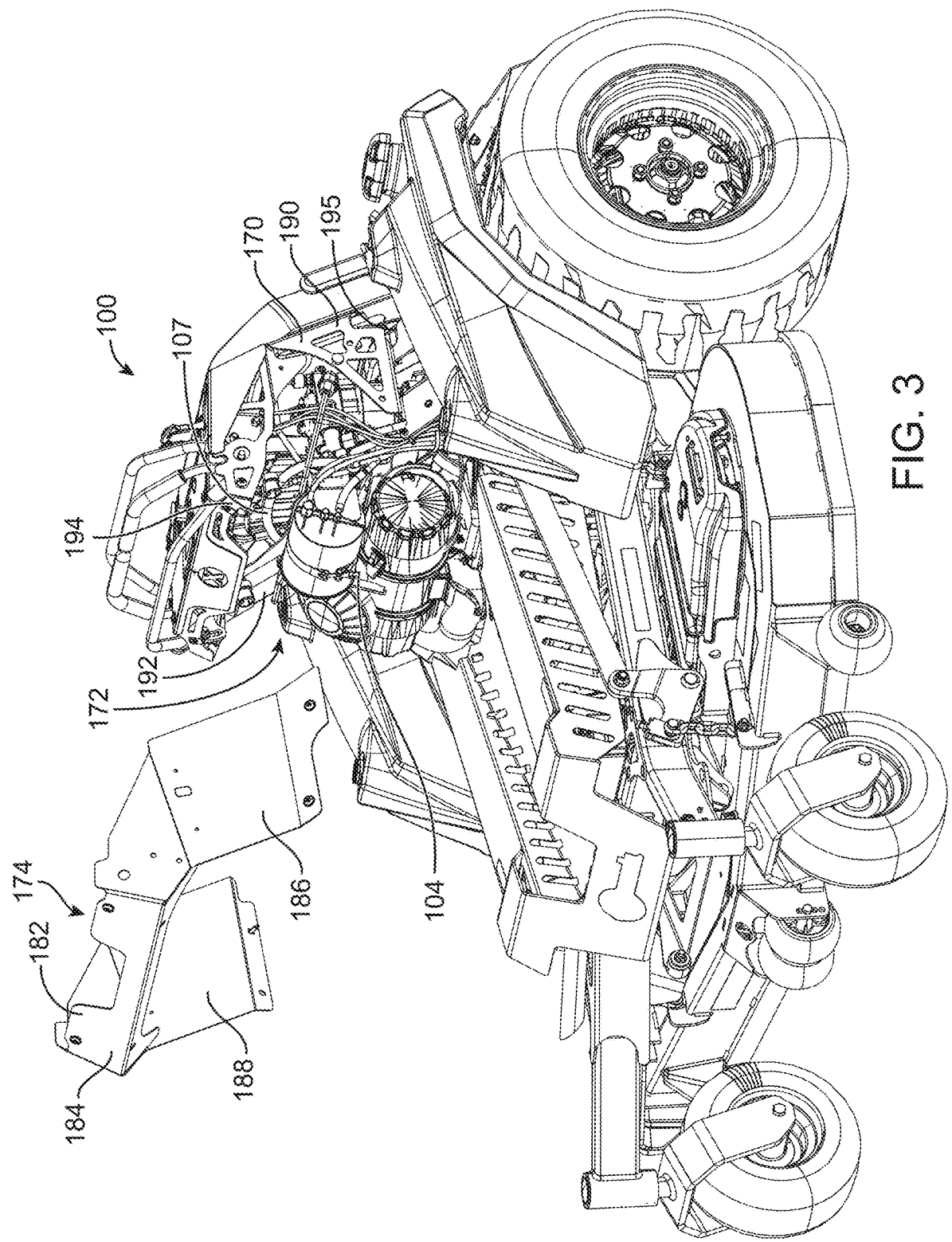
FIG. 3 is a partially exploded left front perspective view of the stand-on riding grounds maintenance vehicle FIG. 1.
Figure 4:
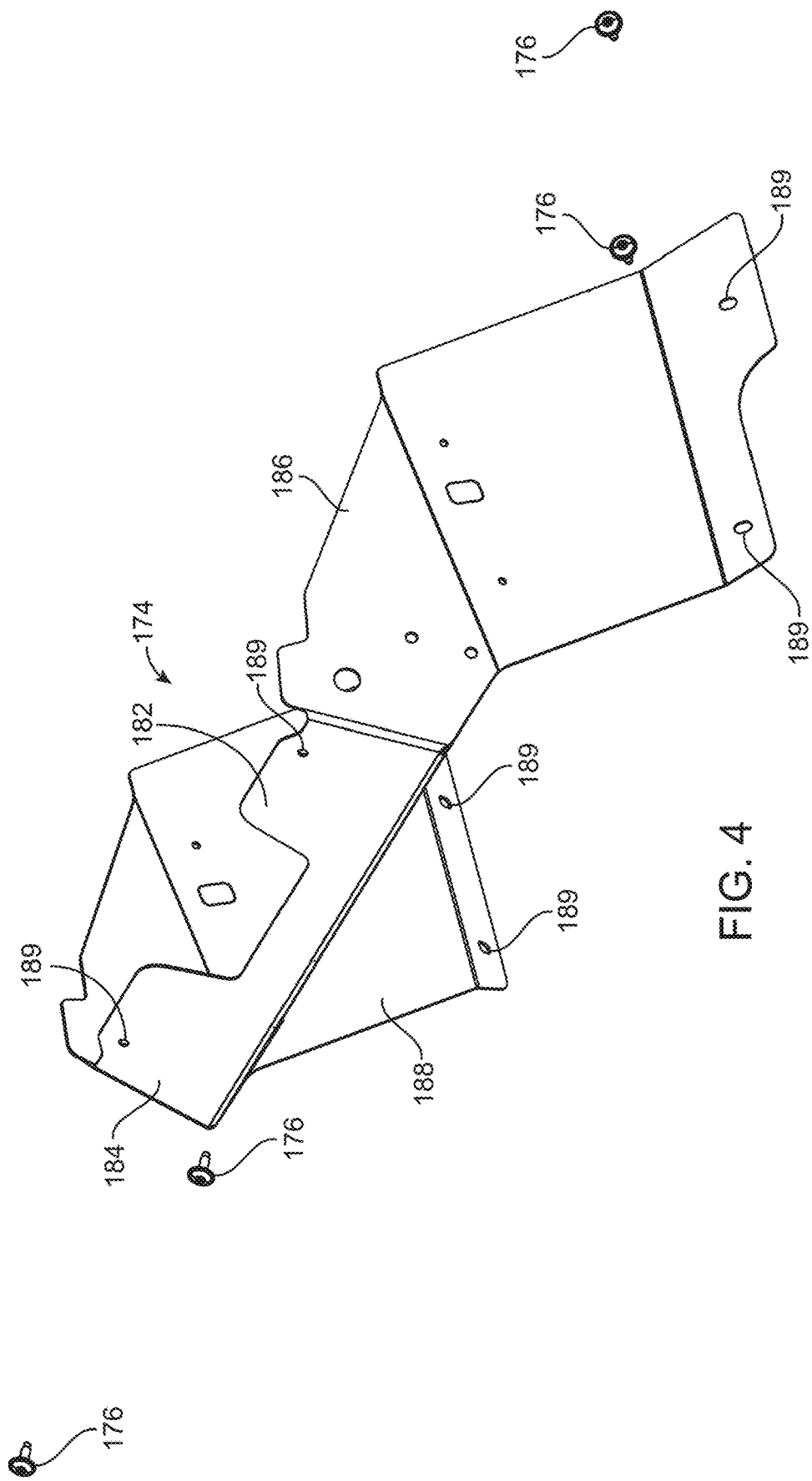
FIG. 4 is a perspective view of a skin of the control tower of the stand-on riding grounds maintenance vehicle FIG. 1.

The control tower 101 also includes a support structure 170 that defines an interior space 172 (FIG. 3) of the control tower and a removable skin 174 connected to the support structure 170 of the control tower using any suitable technique or techniques. In one or more embodiments, the removable skin 174 can be connected to the support structure 170 by one or more fasteners 176 (FIG. 4). In one or more embodiments, the skin 174 is adapted to be at least partially removed from the support structure 170 to facilitate additional access to the interior space 172 of the control tower 101.

As used herein, the term "at least partially removed" means that at least one or more portions of the skin 174 can be removed from the support structure 170 while one or more additional portions of the skin remain removably connected to the support structure or that the entire skin can be removed from the support structure. Further, the term "additional access" as used herein means that partial or complete removal of the skin 174 provides access to the interior space 172 of the control tower 101 in addition to access that may be provided by other openings or passageways to the interior space of the control tower not covered or occluded by the skin or other structure of the control tower. For example, in one or more embodiments, the interior space 172 of the control tower 101 can be completely enclosed by any combination of fixed and removable skins 174. As a result, no access to the interior space 172 of the control tower 101 is provided other than by removal of one or more at least partially removable skins. Further, in one or more embodiments, the control tower 101 can include one or more openings or passageways between an exterior of the tower and the interior space 172 without removal of one or more removable skins. By at least partially removing the removable skin 174, access in addition to any access to the interior space 172 of the control tower 101 already present can be provided.

The frame 102 can include any suitable frame or frames and can be a unitary part or multiple parts connected using any suitable technique or techniques. In one or more embodiments, the frame 102 can support a power source or prime mover 104, e.g., an internal combustion engine. A pair of transversely opposing, ground engaging members, e.g., first and second (left and right) rear drive wheels 106a and 106b, may be coupled to opposite (left and right) rear sides of the chassis to support the mower upon, and propel the vehicle 100 relative to, the ground surface 103. Each drive wheel 106 may be powered by its own hydraulic motor (not shown) that receives power from, at least in one embodiment, its own hydrostatic pump (also not shown). The pumps may be supported by the frame 102 and powered by the prime mover 104 as described, e.g., in U.S. patent application Ser. No. 15/803,979, entitled GROUNDS MAINTENANCE VEHICLE WITH POWER SYSTEM INCORPORATING DUAL DRIVE SHAFTS. In one or more embodiments, the prime mover 104 is operatively coupled to the left and right rear drive wheels 106a, 106b. While not illustrated, other drive systems, e.g., gear or pulley driven systems, may also be utilized without departing from the scope of the disclosure.

Operator controls, as further described herein, permit independent control of the speed and direction of each drive wheel 106, allowing operator control of vehicle 100 speed and direction from a walking or riding (e.g., standing) position generally behind the vehicle 100. A pair of front ground engaging members (e.g., left and right caster wheels 108a, 108b), which may be connected to forwardly extending frame rails 117, may support the front of the vehicle 100 in rolling engagement with the ground surface 103.

Although the illustrated vehicle 100 has the drive wheels 106 in the rear and caster wheels 108 in front, this configuration is not limiting. For example, other embodiments may reverse the location of the wheels, e.g., drive wheels in front and driven or undriven wheels in back. Moreover, other configurations may use different wheel configurations altogether, e.g., a tri-wheel configuration or a vehicle having conventionally-steered wheels. These and other embodiments are certainly possible without departing from the scope of the present disclosure. Moreover, while illustrated herein as wheels, other ground engaging members (e.g., tracks, skids, etc.) are also contemplated.

An implement, e.g., cutting deck 114, may be connected to a lower side of the frame 102 (generally longitudinally between the drive wheels 106 and the caster wheels 108). The cutting deck 114 may include one or more cutting blades (not shown) as known in the art. The cutting blades may be operatively powered, via spindles connected to the deck, by the prime mover 104 via an implement drive system as further described herein. During operation, power is selectively delivered to the cutting deck 114, whereby the blades rotate at a speed sufficient to sever grass and other vegetation as the cutting deck passes over the ground surface 103. As indicated herein, other grounds maintenance vehicles (e.g., snow throwers) may locate the implement above the frame or at other locations along the lower side of the frame (e.g., a forwardly-mounted or "out-front" deck configuration). Moreover, while described as a cutting deck, the implement may be any tool (e.g., snow thrower, aerator, etc.) that attaches to the frame 102.

The exemplary vehicle 100 can also include a standing platform 112 attached to the frame 102 at or near the rear end R. The platform 112, which may support a standing operator, may be moved between a deployed position as shown in FIG. 1, and a stowed position (not shown, but similar to the position of the platform 120 shown in FIG. 2 of U.S. Pat. No. 8,047,310, entitled POWER VEHICLE INCORPORATING VELOCITY CONTROL SYSTEM). In the deployed position, an operator may stand upon the platform 112 during vehicle operation. In one or more embodiments, the platform may be moved to the stowed position to accommodate the operator in a walk-behind configuration. In the deployed position, at least a portion of the platform 112 may be located between the rear drive wheels 106.

Figure 2:
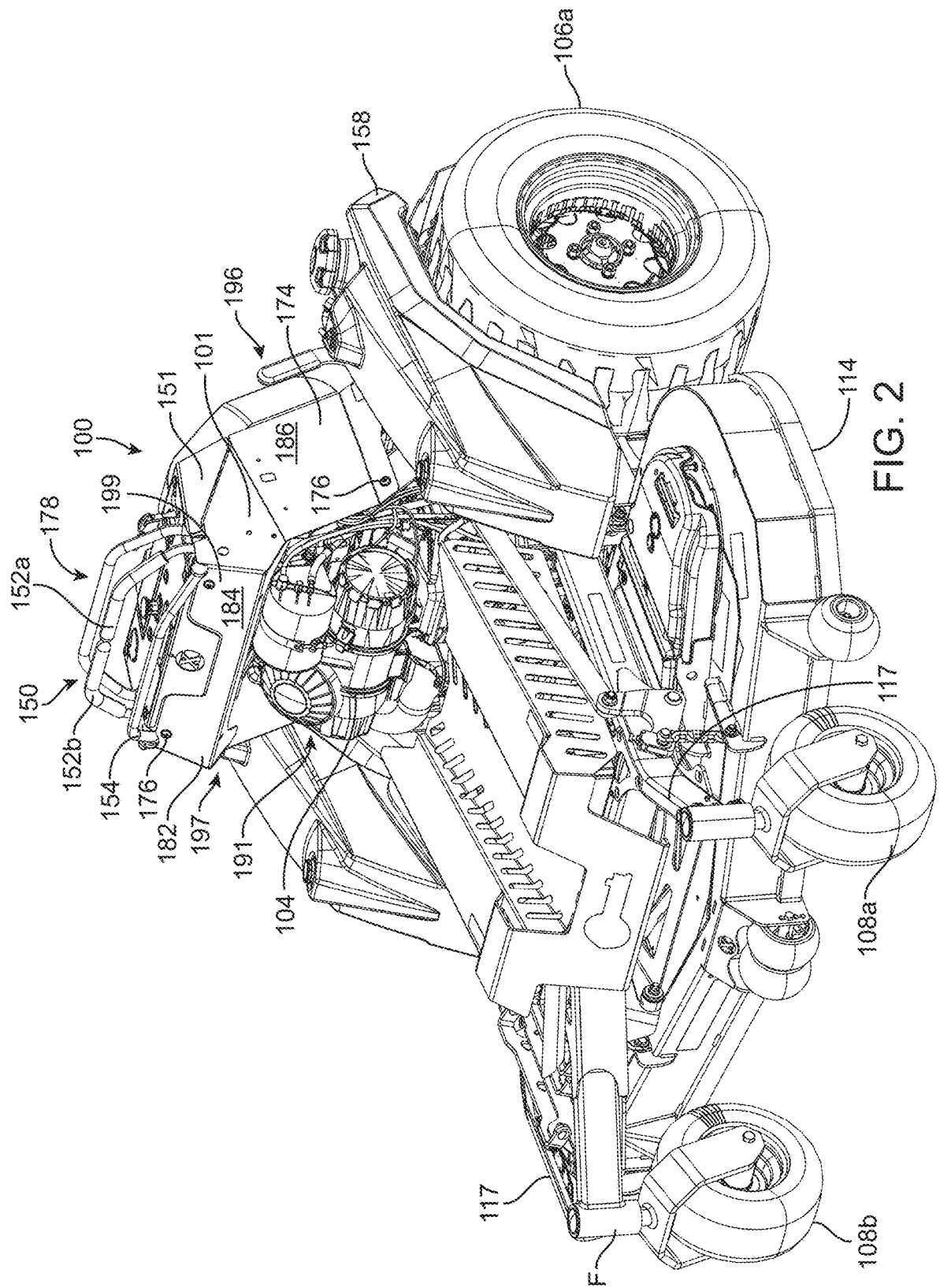
FIG. 2 is a left front perspective view of the stand-on riding grounds maintenance vehicle of FIG. 1.

As illustrated in FIGS. 1-2, the vehicle 100 may further include an operator control system 150. In the illustrated embodiment, the control system 150 may include operator controls that are mounted to an upper portion of the control tower 101. The control tower 101 may be disposed in any suitable location relative to the frame 102. For example, in one or more embodiments, the control tower 101 can be located at or near the rear end R of the vehicle 100 as shown in FIG. 1. Situated near the top of the control tower 101 is a control area 178 defined by a control skin 151. The control area 178 positions mower controls within comfortable reach of an operator who may be standing either behind the mower or upon the platform 112.

The control system 150 may include a first control lever 152a and a second control lever 152b pivotally attached to the vehicle 100, e.g., to the control tower 101. The control levers 152 may be configured to pivot about a generally transverse axis (i.e., an axis transverse to the longitudinal axis 110 of the vehicle 100) between a first or forward stop 154, and a second or rearward stop 156. One or both of the control levers 152 (e.g., 152b as shown in FIG. 1) may also be biased for pivotal outward movement (e.g., in a direction 153 about an axis generally parallel to the longitudinal axis 110). Such a configuration may permit, upon pivotal inward movement of the control lever 152b by the operator to the position shown in FIG. 1, activation of an operator presence switch (not shown). As is recognized in the art, actuation of the operator presence switch may be required before the operator can activate various mower subsystems.

The control levers 152 may further be biased to an intermediate, neutral position between the two stops 154 and 156 as shown in FIGS. 1 and 2. Movement of either of the control levers 152 (e.g., lever 152a) forwardly (e.g., towards the forward stop 154) may result in an incremental increase in forward speed of the respective drive wheel 106 (e.g., wheel 106a) via a traction drive system as described below. Similarly, movement of either of the control levers rearwardly (e.g., towards the rearward stop 156) may result in an incremental increase in rearward speed of the respective drive wheel 106. The neutral position of the control levers 152 may be located more closely to the rearward stop 156 to provide a greater range of movement of the levers for forward speed control.

The control levers 152 may each thus be movable between a first neutral position corresponding to first or zero forward velocity of its respective drive wheel 106, and a second position (abutting the forward stop 154) corresponding to a second or maximum forward velocity of its respective drive wheel. As a result, each control lever 152 may independently vary a velocity of its respective drive wheel 106 incrementally between zero forward velocity and maximum forward velocity without varying the engine throttle. Each lever 152 may additionally be movable to a third position (abutting the stop 156) corresponding to a maximum reverse velocity of its respective drive wheel 106.

As FIGS. 1-2 illustrate, the control system 150 may also include other features. For instance, a parking brake handle (not shown) may be provided to selectively activate a brake when the vehicle is parked. A deck height adjustment lever 160 may also be provided to adjust the cutting height of the deck 114. Other controls may include a throttle lever to control the speed of the engine 104 and an implement clutch control 162 to initiate and terminate power delivery to the cutting blades of the mower deck 114.

The support structure 170 (see FIG. 3) of the control tower 101 can include any suitable structure that provides support to one or more skins, the control area 178, the traction drive system 202, and a thigh pad 180 that is connected, e.g., to a rear side 195 of the support structure using any suitable technique or techniques. As stated above, the support structure 170 defines the interior space 172 of the control tower 101. Further, the support structure 170 can have any suitable dimensions and take any suitable shape or shapes. As can be seen in FIG. 3, the support structure 170 includes a left side 190, a right side 192, a front side 194, and the rear side 195. The left side 190, the right side 192, the front side 194, and the rear side 195 can be connected using any suitable technique or techniques. In one or more embodiments, two or more of the left side 190, the right side 192, the front side 194, and the rear side 195 of the support structure 170 can be integral.

Removably connected to the support structure 170 is the skin 174 (shown exploded in FIG. 3). Although illustrated as including one removable skin 174, the control tower 101 can include any suitable number of removable skins, e.g., one, two, or three or more removable skins. Further, the control tower 101 can include one or more fixed skins, e.g., control panel 151, that are connected to the support structure 170 and not intended to be removed. For example, in one or more embodiments, one or more fixed skins can be connected to the support structure 170, e.g., by welding, adhering, mechanically connecting, etc.

The removable skin 174 can have any suitable dimensions and take any suitable shape or shapes. In one or more embodiments, the removable skin can be nonplanar. As used herein, the term "nonplanar" means that the removable skin 174 does not lie or is not confined within a single plane, i.e., the skin has a three-dimensional shape. In one or more embodiments, the skin 174 can partially or completely cover left, right, front, and rear sides 190, 192, 194, 195 of the support structure 170.

FIG. 4 is a schematic perspective view of an exemplary removable skin 174. As can be seen in FIG. 4, the skin 174 includes a front side 184, a lateral side 186, and a second lateral side 188. In one or more embodiments, the removable skin 174 is a unitary removable skin, i.e., the front side 184, lateral side 186, and second lateral side 188 are integral. In one or more embodiments, at least two of the front, lateral, or second lateral sides 184, 186, 188 are removably connected together. For example, the front side 184 can be removably connected to the lateral side 186. Further, in one or more embodiments, each of the lateral and second lateral sides 186, 188 can be removably connected to the front side 184 using any suitable technique or techniques. Further, in one or more embodiments, one or more tabs can be disposed on at least one of the front side 184, lateral side 186 or second lateral side 188, and one or more complementary slots can be disposed on at least one of the front, lateral, and second lateral sides that are adapted to receive the one or more tabs of the mating piece. For example, the lateral side 186 can include a tab that can be inserted into a slot disposed on the front side 184.

When the skin 174 is connected to the support structure 170, the front side 184 is disposed over at least the front side 194 of the support structure, the lateral side 186 is disposed over at least the left side 190 of the support structure, and the second lateral side 188 is disposed over at least the right side 192 of the support structure. Although depicted as being disposed over the left side 190 of the support structure 170, the lateral side 186 can instead be disposed over at least the right side 192 of the support structure. In other words, the lateral side 186 of the skin 174 can be disposed over the left side 190 or the right side 192 of the support structure 170.

Further, in one or more embodiments, a portion 182 of the skin 174 can be disposed above an uppermost surface 107 of a portion of the prime mover 104 that is disposed within the interior space 172 of the support structure 170. In one or more embodiments, the portion 182 can be a portion of at least one of the front side 184, lateral side 186, or second lateral side 188. In one or more embodiments, the entirety of at least one of the front side 184, the lateral side 186, or the second lateral side 188 can be disposed above the uppermost surface 107 of the portion of the prime mover 104 that is disposed within the interior space 172 of the support structure 170.

The various sides of the removable skin 174 can be connected to any side or sides of the support structure 170 of the control tower 101. In one or more embodiments, the front side 184 of the skin 174 is removably connected to the front side 194 of the support structure 170. In one or more embodiments, the lateral side 186 of the skin 174 is removably connected to the left (or right) side 190 of the support structure 170. Further, in one or more embodiments, the second lateral side 188 of the skin 174 is removably connected to the right (or left) side 192 of the support structure 170.

The skin 174 can be connected to the support structure 170 in any suitable location or locations. Further, the skin 174 can be connected to the support structure 170 using any suitable technique or techniques. For example, in one or more embodiments, the skin 174 can be connected to the support structure 170 using one or more fasteners 176. Any suitable fasteners 176 can be utilized to connect the skin 174 to the support structure 170, e.g., one or more quarter-turn screws, locking pins, bolts, wing nuts, hook and loop fasteners, repositionable adhesives, rivets, capscrews, etc.

The fasteners 176 can be disposed in one or more through holes 189 disposed in the skin 174. The through holes 189 can be disposed in any suitable location or locations in the skin 174. Although not shown, one or more complementary through holes can be disposed in the support structure 170 that align with the through holes 189 disposed in the skin 174 such that a fastener 176 can extend through a through hole of the skin and a through hole of the structure.

Figure 6:
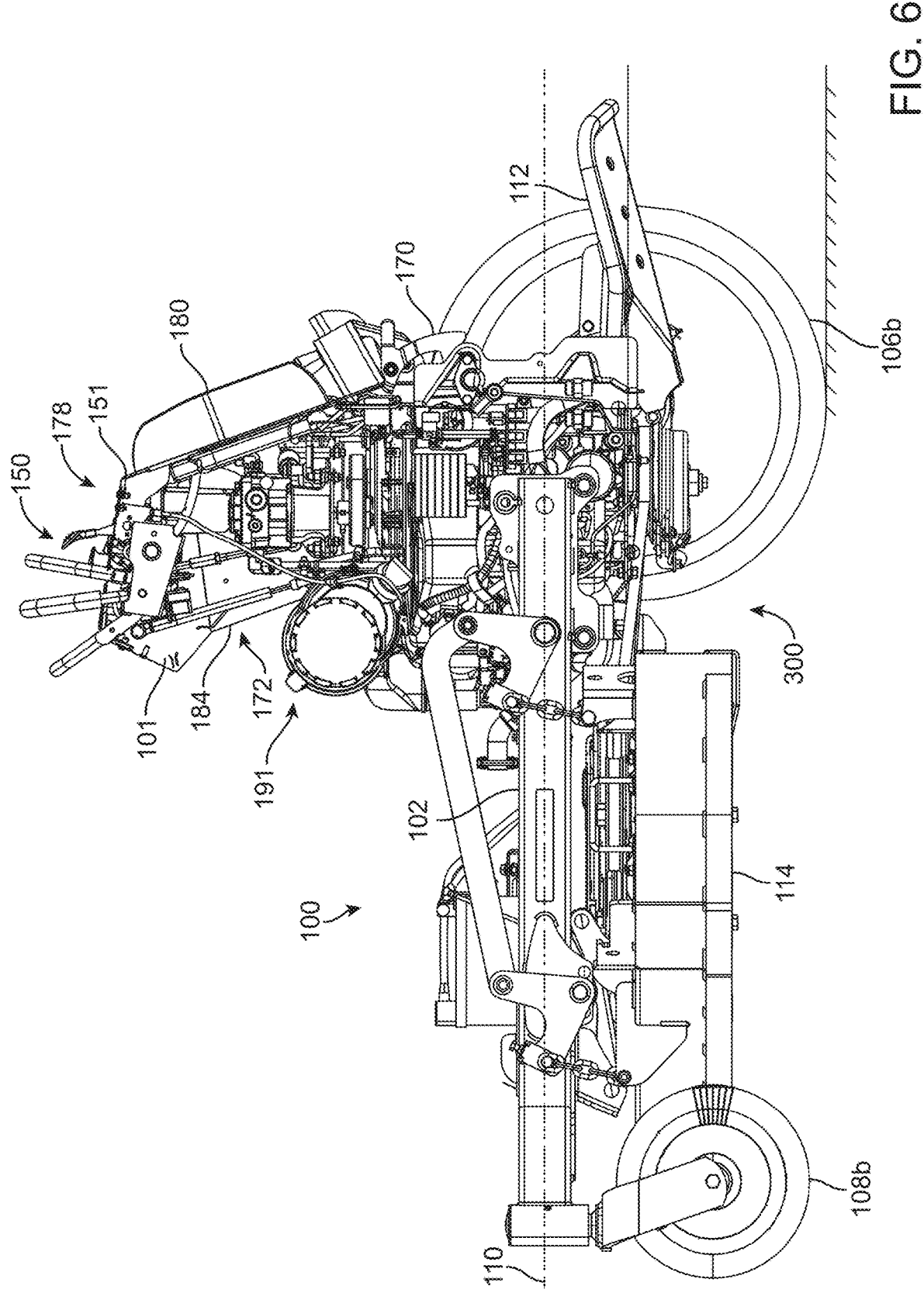
FIG. 6 is partial side elevation view of the vehicle of FIG. 1, illustrating an exemplary location of the power source and traction drive system relative to an operator platform.

The skin 174 can facilitate additional access to one or more components 191 of the vehicle 100 disposed at least partially within the interior space 172 of the control tower 101 (see, e.g., FIG. 6). As used herein, the term "at least partially within" means that at least one or more portions of a component 191 is disposed within the interior space 172 of the control tower 101. In one or more embodiments, the component 191 can be completely disposed within the interior space 172 of the control tower 101. Any suitable component or components 191 can be disposed at least partially within the interior space 172 of the control tower 101, e.g., one or more of a fuel pump, prime mover (e.g., engine), traction drive system (e.g., drive mechanisms), actuation mechanism (e.g., control actuators), cables, fluid reservoirs, maintenance points (e.g., zerk grease fittings, electric control system, electric drives, generators, etc. In one or more embodiments, the skin 174 is adapted to be at least partially removed from the support structure 170 to provide access to the components 191.

Figure 5:
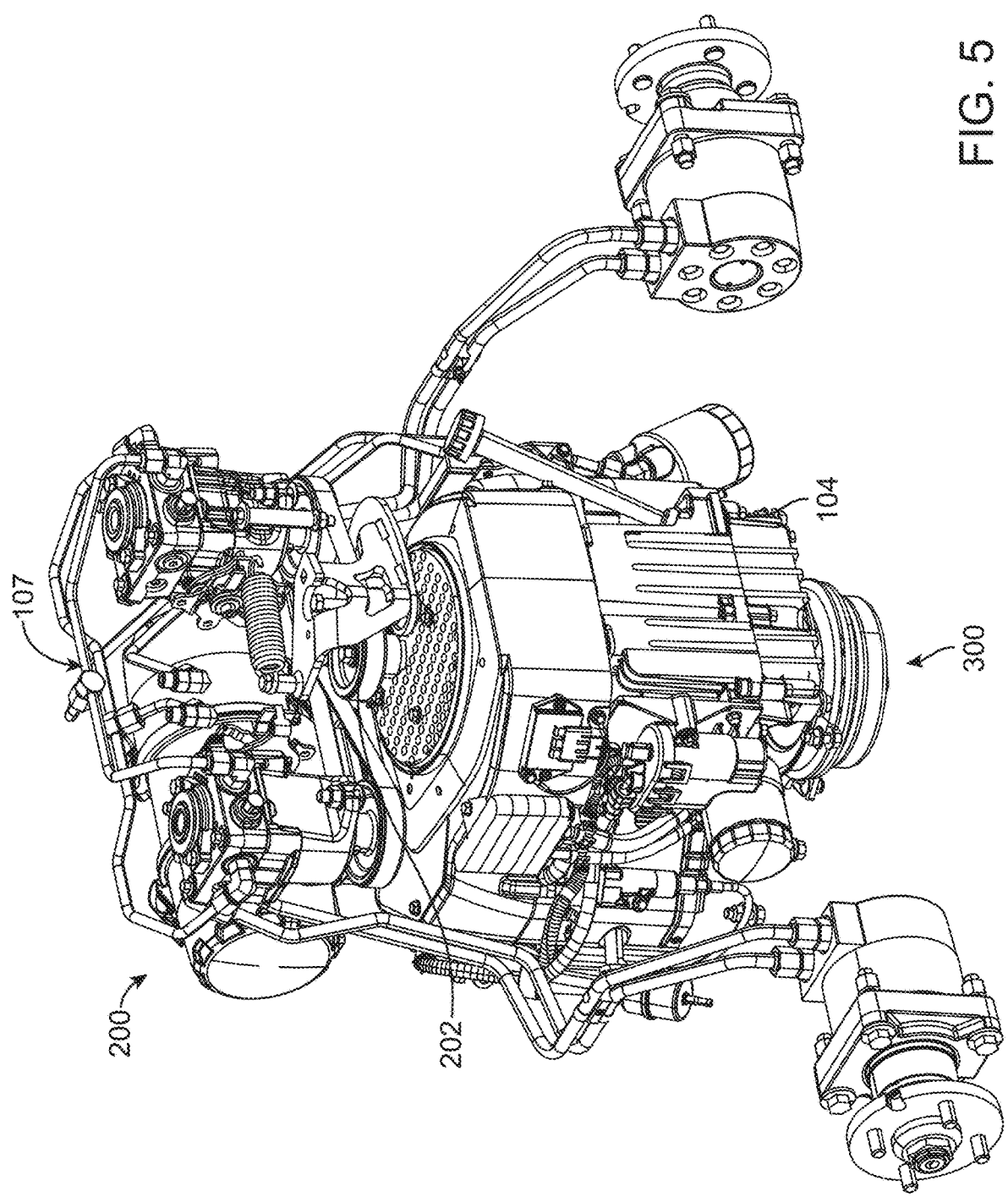
FIG. 5 is a schematic perspective view of a power source and traction drive system shown isolated from the vehicle of FIG. 1.

Moreover, as mentioned above, the vehicle 100 can include any suitable power system 200, e.g., one or more embodiments of power systems described in U.S. patent application Ser. No. 15/803,979, entitled GROUNDS MAINTENANCE VEHICLE WITH POWER SYSTEM INCORPORATING DUAL DRIVE SHAFTS. The exemplary power system 200 is shown in FIG. 5 and may include the power source (e.g., the prime mover 104), as well as a traction drive system 202 to power wheel motors 105 and implement drive system 300 to power cutting deck 114.

The complete disclosure of the patents, patent documents, and publications cited herein are incorporated by reference in their entirety as if each were individually incorporated. In the event that any inconsistency exists between the disclosure of the present application and the disclosure(s) of any document incorporated herein by reference, the disclosure of the present application shall govern.

Illustrative embodiments are described, and reference has been made to possible variations of the same. These and other variations, combinations, and modifications will be apparent to those skilled in the art, and it should be understood that the claims are not limited to the illustrative embodiments set forth herein.

What is claimed is:

1. A grounds maintenance vehicle comprising a frame that includes a front end, a rear end, and a control tower disposed at or near the rear end of the frame, wherein the control tower comprises:
    a support structure that defines an interior space of the control tower; and
    a nonplanar removable skin connected to the support structure and comprising a front side disposed over a front side of the support structure and a lateral side disposed over at least one of a left side or a right side of the support structure, wherein a portion of at least one of the front side or lateral side of the removable skin is disposed above an uppermost surface of a prime mover that is connected to the frame, and further wherein the removable skin is adapted to be at least partially removed from the support structure to facilitate additional access to the interior space of the control tower.

2. The vehicle of claim 1, further comprising a platform attached to the frame at or near the rear end, wherein the platform is adapted to support a standing operator.

3. The vehicle of claim 1, further comprising:
    left and right rear drive wheels located near the rear end of the frame;
    left and right front wheels located near the front end of the frame; and
    an implement connected to the frame;
    wherein the prime mover is connected to the frame at or near the control tower and operatively coupled to the left and right rear drive wheels.

4. The vehicle of claim 1, wherein the prime mover comprises an internal combustion engine.

5. The vehicle of claim 1, wherein the control tower further comprises a top surface comprising a control area, and wherein vehicle controls are disposed in or on the control area, the controls adapted to be manipulated by an operator.

6. The vehicle of claim 1, further comprising a control system that comprises one or more control levers pivotally attached to the control tower, wherein the control lever is adapted to pivot about an axis that is generally transverse to a longitudinal axis of the frame.

7. The vehicle of claim 1, wherein the lateral side of the removable skin is disposed over the left side of the support structure and a second lateral side of the removable skin is disposed over the right side of the support structure.

8. The vehicle of claim 7, wherein the lateral side of the removable skin is removably connected to the left side of the support structure and the second lateral side of the removable skin is removably connected to the right side of the support structure.

9. The vehicle of claim 1, wherein removal of the removable skin from the support structure provides additional access to at least one of the prime mover, a traction drive system, or an actuation mechanism.

10. The vehicle of claim 1, wherein the removable skin is a unitary removable skin.

11. The vehicle of claim 1, wherein the front side and the lateral side of the removable skin are removably connected.

12. The vehicle of claim 1, further comprising a fastener that is adapted to connect the removable skin to the support structure, wherein the fastener comprises a capscrew.

13. The vehicle of claim 1, wherein at least a portion of the prime mover is disposed within the interior space of the support structure.

14. The vehicle of claim 1, wherein the control tower further comprises a pad connected to a rear side of the support structure.

15. A stand-on riding grounds maintenance vehicle comprising a frame that includes a front end, a rear end, and a control tower disposed at or near the rear end of the frame, wherein the control tower comprises:
    a platform attached to the frame at or near the rear end, wherein the platform is adapted to support a standing operator;
    a support structure that defines an interior space of the control tower;

a prime mover connected to the frame at or near the control tower; and a nonplanar removable skin connected to the support structure and comprising a front side disposed over a front side of the support structure and a lateral side disposed over at least one of a left side or a right side of the support structure, wherein a portion of at least one of the front side or lateral side of the removable skin is disposed above an uppermost surface of the prime mover, and further wherein the removable skin is adapted to be at least partially removed from the support structure to facilitate additional access to the interior space of the control tower.

16. The vehicle of claim 15, wherein the lateral side of the removable skin is removably connected to the left side of the support structure and a second lateral side of the removable skin is removably connected to the right side of the support structure.

17. The vehicle of claim 16, wherein the removable skin is a unitary removable skin.

18. The vehicle of claim 15, wherein the front side and the lateral side of the removable skin are removably connected.

19. The vehicle of claim 15, further comprising a fastener that is adapted to removably connect the removable skin to the support structure, wherein the fastener comprises at least one of a capscrew or a locking pin.

20. A stand-on riding grounds maintenance vehicle comprising a frame that includes a front end, a rear end, and a control tower disposed at or near the rear end of the frame, wherein the control tower comprises:

a platform attached to the frame at or near the rear end, wherein the platform is adapted to support a standing operator;

a support structure that defines an interior space of the control tower;

a prime mover connected to the frame at or near the control tower;

a nonplanar unitary removable skin connected to the support structure and comprising a front side that is disposed over and removably connected to a front side of the support structure, a lateral side that is disposed over and removably connected to a left side of the support structure, and a second lateral side that is disposed over and removably connected to a right side of the support structure, wherein a portion of at least one of the front side, lateral side, or second lateral side of the support structure is disposed above an uppermost surface of the prime mover, wherein the removable skin is adapted to be removed from the support structure to facilitate additional access to at least one of the prime mover, a traction drive system, or an actuation mechanism; and a pad disposed over and connected to a rear side of the support structure.

* * * * *